United States Patent [19]
Yasuda

[11] Patent Number: 6,034,698
[45] Date of Patent: Mar. 7, 2000

[54] HAIRDO PATTERN SELECTING SYSTEM

[75] Inventor: Hiroaki Yasuda, Kobe, Japan

[73] Assignee: Yasuda Seiko Co., Ltd., Osaka, Japan

[21] Appl. No.: 08/681,471

[22] Filed: Jul. 23, 1996

[30] Foreign Application Priority Data

| Aug. 3, 1995 | [JP] | Japan | 7-219511 |
| Jul. 5, 1996 | [JP] | Japan | 8-195411 |

[51] Int. Cl.[7] ................................................. G06F 15/00
[52] U.S. Cl. ......................................................... 345/435
[58] Field of Search ................................. 345/435, 473, 345/474, 475, 437, 113, 114

[56] References Cited

U.S. PATENT DOCUMENTS

| 4,434,467 | 2/1984 | Scott | 345/435 |
| 4,731,743 | 3/1988 | Blancato | 364/521 |
| 5,060,171 | 10/1991 | Steir et al. | 364/521 |
| 5,588,096 | 12/1996 | Sato et al. | 345/435 |

*Primary Examiner*—Phu K. Nguyen
*Attorney, Agent, or Firm*—Wenderoth, Lind & Ponack, L.L.P.

[57] ABSTRACT

To make it possible to verify the finished state of the entire head in advance to thereby freely select a hair style suitable to the taste of the person 4 receiving the hairdressing service by adjusting the hair style to the face of that person, the hairdo pattern selecting system is realized in a way to: accumulate a multiple number of hairdo patterns in computer 5, in the prescribed angle range θ and as continuous hairdo patterns of a prescribed speed, photograph and input in the computer 5 the head of the person 4 receiving the service, the prescribed angle range θ agreeing with the hairdo pattern images and as continuous head images of a prescribed speed; synthesize the head image and the hairdo pattern image selected from among a multiple number of hairdo pattern images and output the result as continuous synthesized images of a prescribed speed on display 6.

16 Claims, 3 Drawing Sheets

HAIRDO PATTERN SELECTING SYSTEM

BACKGROUND OF THE INVENTION

The present invention relates to a hairdo pattern selecting system, especially a hairdo pattern selecting system realized in a way to make it possible to freely select a hair style suitable to the taste of the person receiving the hairdressing service by adjusting it to the face of that person.

Conventionally, in a beauty parlor, etc., the hairdo pattern is decided by adjusting a pattern, selected by the person (client) receiving the hairdressing service from among various models carried on beauty magazines or fashion magazines, etc., according to the characteristics of the client's face.

By this method, however, it is often the case that the state after execution is much different from what was expected by the person receiving the service because there is no way to verify the state after execution (finished state) in advance, eventually leading to trouble.

To prevent this kind of trouble, a proposal is made for executing perming or setting after verifying the state after execution in advance, by photographing the face of the person receiving the service from the front side or obliquely with a video camera, inputting this still face image from either the front or oblique side and the still hairdo pattern image selected by that person in a computer for synthesis and outputting the synthesized image on a display.

However, with the conventional hairdo pattern selecting system, it is only a partial state after execution seen from some specific direction such as a front view or a view from an oblique side, etc. of the face of the person receiving the service that can be verified. This poses a problem of not being able to sufficiently meet the needs of persons receiving the service who wish to check the state after execution of the entire head (refers to "face and head" in the present Specification).

SUMMARY OF THE INVENTION

The object of the present invention is to provide a hairdo pattern selecting system realized in such a way as to make it possible to solve the problems of the conventional hairdo pattern selecting system, check the state, after execution, of the entire head in advance and to thereby freely select a hair style suitable to the taste of the person receiving the hairdressing service by adjusting it to the face of that person.

To achieve the object, the hairdo pattern selecting system of the present invention is characterized in that it accumulates a multiple number of hairdo patterns in a computer, at a prescribed angle range and while continuous hairdo patterns are shown at a prescribed speed, photographs and inputs into the computer the head of the person receiving the service, at a prescribed angle range agreeing with the hairdo pattern images and as the continuous head images are shown at a prescribed speed, synthesizes the head image and the hairdo pattern image selected from among a multiple number of hairdo pattern images and outputs the result as continuous synthesized images at the prescribed speed on a display.

In that case, the system can output synthesized image of prescribed angles as still images on the display.

It can also output synthesized images of prescribed angles as a hard copy on a printer.

And, because a range of 360° is not necessarily required as the range for accumulating and photographing of hairdo pattern images and head images, it is possible to reduce the cost by setting this range at 225° with reference to the center back of the head.

According to the hairdo pattern selecting system of the present invention, it is possible to check the state after execution in a prescribed range of angles of the head in advance as continuous images at a prescribed speed (moving image) check them as either a still image or hard copy as required, and to thereby freely select a hair style suitable to the taste of the person receiving the hairdressing service by adjusting it to the face of that person.

In that case, especially because this system is capable of three-dimensionally verifying the state after execution in a prescribed range of angles of the head as continuous images at the prescribed speed (moving image), it is possible to make hair style selections more accurately compared with other flat methods of verification such as that of the conventional hairdo pattern selecting system without deviation of the state after execution from what was expected by the person receiving the service and to thereby prevent trouble.

DETAILED DESCRIPTION OF THE INVENTION

An embodiment of the hairdo pattern selecting system of the present invention will be explained hereafter based on the drawings.

First, explanation will be given on an example of the equipment used for the hairdo pattern selecting system of the present invention.

Figure 1:
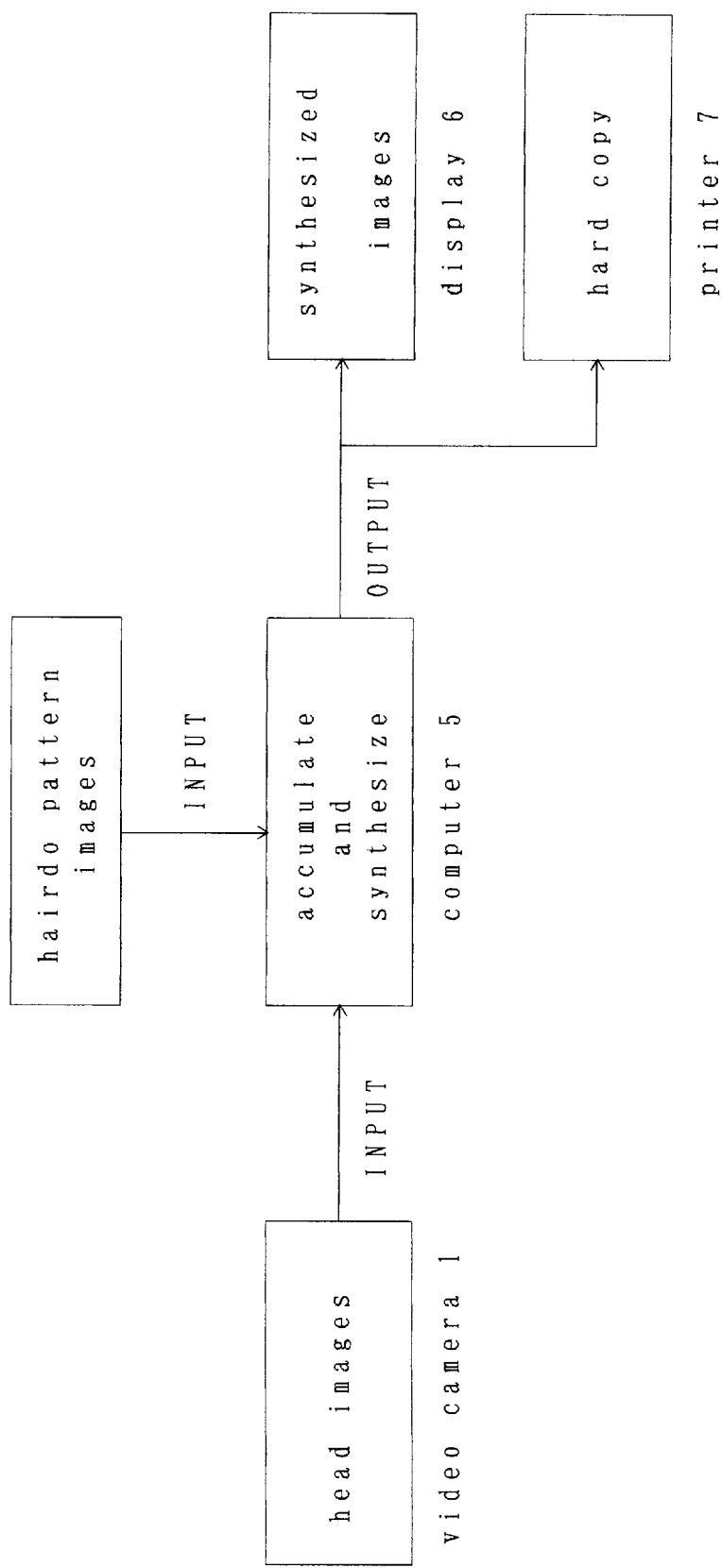
FIG. 1 is a block diagram of the hairdo pattern selecting system of the present invention.
Figure 2:
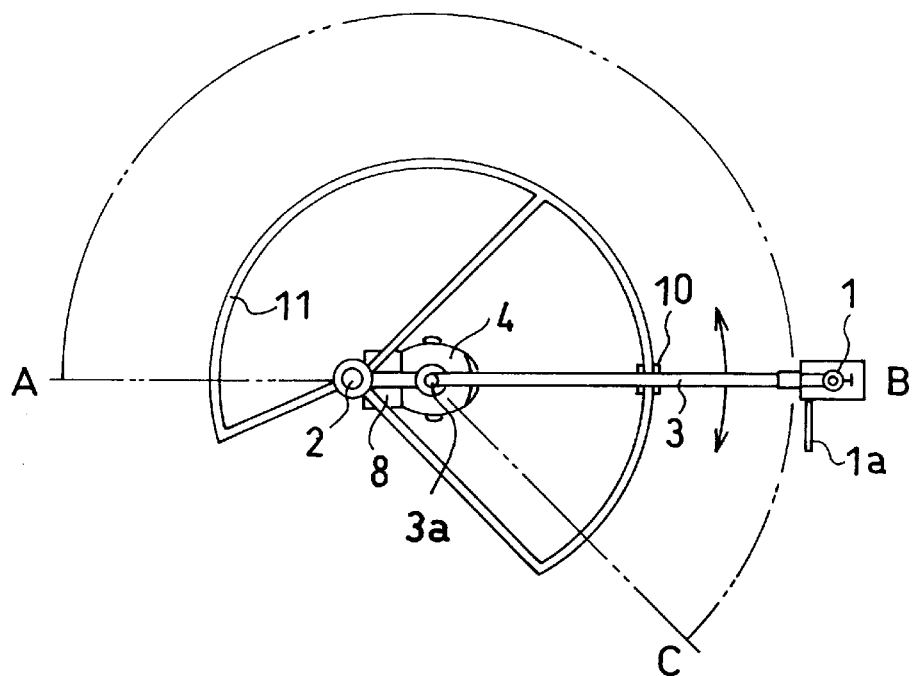
FIG. 2 is a plan view showing an example of the equipment used for the hairdo pattern selecting system of the present invention.
Figure 3:
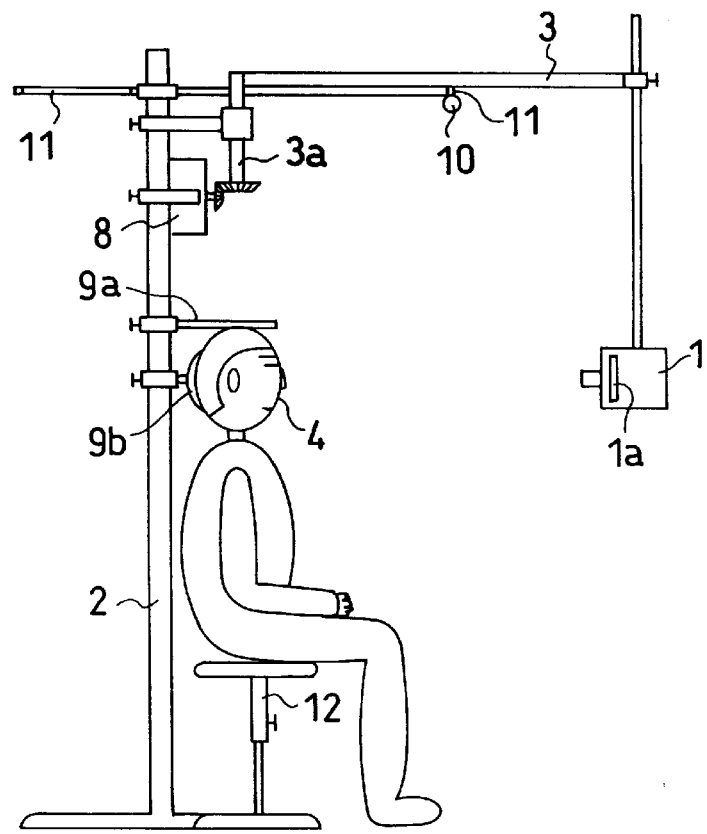
FIG. 3 is a side view showing an example of the equipment used for the hairdo pattern selecting system of the present invention.
Figure 4:
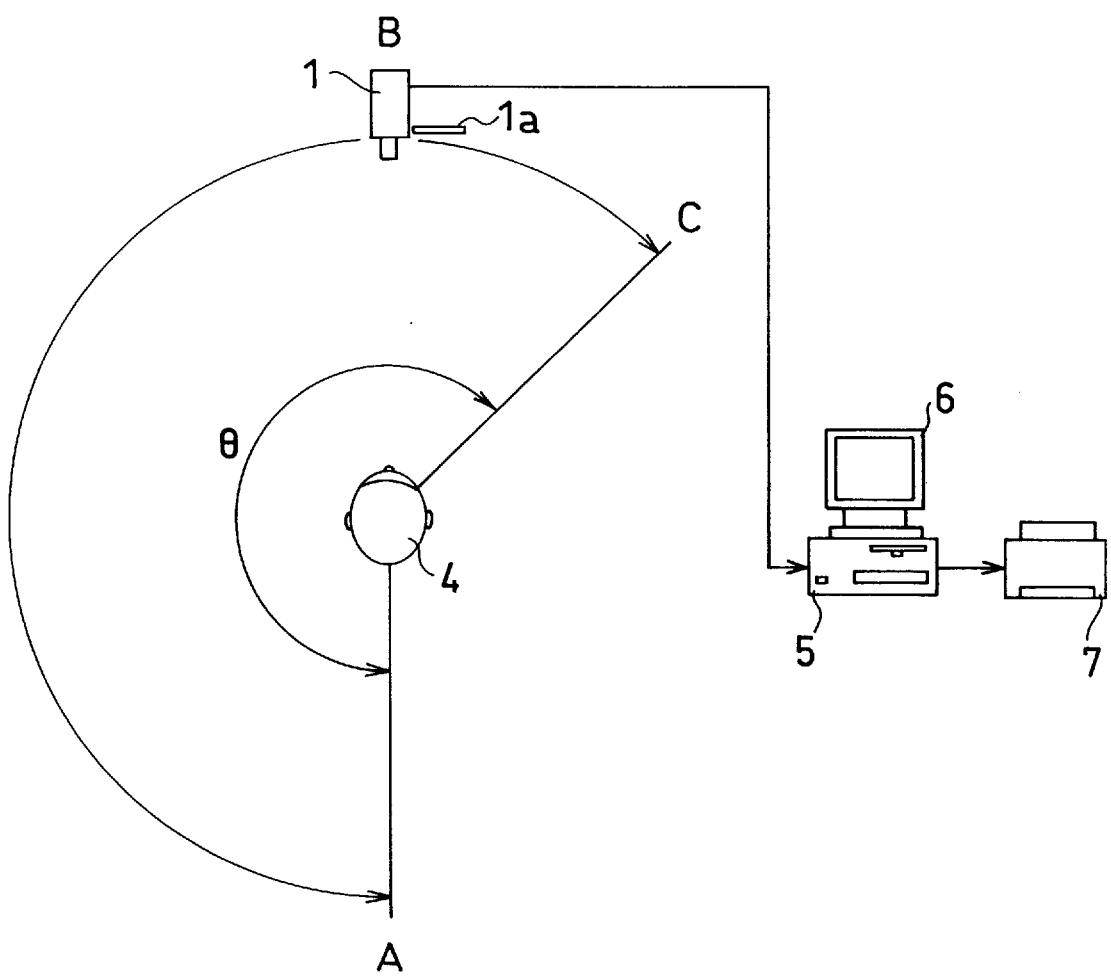
FIG. 4 is a conceptual drawing showing an example of the equipment used for the hairdo pattern selecting system of the present invention.

This system is composed, as shown in FIG. 2 to FIG. 4, of video camera 1 rotatably arranged on stanchion 2 through camera supporting rod 3, computer 5 for inputting continuous images photographed by the video camera 1 for prescribed processing, display 6 and printer 7. The system is thereby capable of accumulating a multiple number of hairdo patterns in computer in the prescribed angle range θ and as continuous hairdo patterns of a prescribed speed, as shown in FIG. 1; photographing the head 4 of the person receiving the service in the prescribed angle range θ agreeing with the hairdo pattern images and as continuous head images of a prescribed speed with the video camera 1; inputting the continuous head images in the computer 5; synthesizing the image of the head and the hairdo pattern image selected from among a multiple number of hairdo pattern images accumulated in the computer 5; and outputting the result as continuous synthesized images of a prescribed speed on the display 6, outputting a synthesized image of a prescribed angle as a still image on the display 6, or outputting a synthesized image of a prescribed angle as a hard copy on the printer 7.

In that case, the stanchion 2 is provided with motor 8 such as synchronous motor, etc. for rotatably driving the video camera 1 around the axis of rotation 3a of the camera supporting rod 3 and is also provided at its upper end, as required, with guide rail 11 for supporting an intermediate part of the camera supporting rod 3, so as to rotatably drive the video camera 1 smoothly in the prescribed angle range θ and at a prescribed speed.

While, in the present embodiment, the prescribed angle range θ or rotatably driving the video camera 1 is 225° with reference to the center back of the head of the person 4 receiving the service, this range can be set optionally including the reference position and it is also possible to set this range in a range larger than 225° for example and dispose the guide rail 11 according to that range.

Moreover, it is desirable to provide, on the stanchion 2, attachments 9a, 9b for supporting and positioning the head of the person 4 receiving the service so that the video camera 1 and the position of the head of the person 4 receiving the service sitting on chair 12 may face each other horizontally, and to use the video camera 1 with monitor 1a to make it possible for the person 4 receiving the service to check the accurate position of his/her head.

It is also possible to use the display 6 in place of the monitor 1a for the person 4 receiving the service to check the accurate position of the head.

The guide rail 11 will be provided with level vial 10 to make it possible to check the horizontality of the guide rail provided on the stanchion 2 and limit switch (not illustrated) for stipulating the angle range θ at which to rotatably drive the video camera 1. When the guide rail 11 is omitted, the limit switch will be attached directly to the stanchion 2.

Moreover, camera supporting rod 3, motor 8, attachments 9a, 9b and guide rail 11 will be fastened to the stanchion 2 in a way to be adjustable in mounting position, while the chair 12 will be of a type adjustable in height.

Next, explanation will be given for the method of use of this system.

First, photograph a multiple number of hairdo pattern in the prescribed angle range θ and as continuous hairdo patterns of a prescribed speed with the video camera 1 and input and accumulate them in the computer 5 respectively.

This is done, usually, by putting a real wig such as that of long hair, short hair, "sauvage" hair, etc., for example, on a doll, installing it at the prescribed position of the system i.e. at the position of head of the person 4 receiving the service, photographing continuous hairdo pattern images by rotatably driving the video camera 1 in the prescribed angle range θ or in the range of 225° with reference to the center back of the head of the person 4 receiving the service, for example, and at a prescribed speed, and inputting and accumulating such images in the computer 5. However, it is also possible to accumulate a multiple number of standard hairdo patterns in the computer 5 in advance as hairdo pattern images or synthesize such images by computer graphics without using any real wig.

Next, photograph the head of the person 4 receiving the service in the prescribed angle range θ agreeing with the hairdo pattern images and as continuous hairdo pattern images of a prescribed speed by means of the video camera 1 and input and accumulate them in the computer 5.

This is made by rotatably driving the video camera 1 in the prescribed angle range θ or in the range of 225° with reference to the center back of the head of the person receiving the service 4, for example and at a prescribed speed, and inputting and accumulating such images in the computer 5.

As for the image of head of the person 4 receiving the service, while the hair part is usually held tight by using a hair band or neckerchief because the hair is unnecessary and images are fetched by deleting the back and other unnecessary parts, it is also possible to delete unnecessary parts of the photographed head images on the computer 5.

Synthesize, on the computer 5, the image of head of the person 4 receiving the service obtained this way with the hairdo pattern image selected from among a multiple number of hairdo pattern images accumulated in the computer 5, and output the result as continuous synthesized image of a prescribed speed on the display 6, output a synthesized image of a prescribed angle as still image on the display 6, or output a synthesized image of a prescribed angle as a hard copy on the printer 7.

In that case, if one hair style is unsatisfactory, all that has to be done is to synthesize, with the computer 5, a new one by combining the image of head of the person 4 receiving the service with another hairdo pattern image stored in the computer 5, thus enabling free choice of a hairdo pattern suitable to the taste of the person 4 receiving the service by adjusting the pattern to the face of the person 4 receiving the service.

When the image of head of the person 4 receiving the service and the hair image are synthesized, the sizes of both images do not necessarily agree with each other.

When there is some disagreement of size between the two as mentioned above, set reference points at proper points of the contour line of the face, borders of the hair, etc. and construct the system in a way to be able to synthesize both images after correcting the hairdo pattern image in such a way that the sizes of both images agree with each other, for example, on the computer 5, according to such reference points.

As described above, this system makes it possible to check the state after execution at a prescribed angle of the head in advance as continuous images of a prescribed speed (moving image) and to also check them as either a still image or a hard copy as required, and to thereby freely select a hair style suitable to the taste of the person receiving the service and perform perming or setting by adjusting it to the face of that person.

What is claimed is:

1. A hairdo pattern selecting system comprising:
    a memory for storing a plurality of hairdo patterns, each of the hairdo patterns including hairdo pattern images in a prescribed angle range to be shown at a prescribed speed;
    a rotatably driven camera for obtaining head images in the prescribed angle range and at a prescribed speed from around the head of a person;
    a synthesizing means for synthesizing the head images with the hairdo pattern images of a selected hairdo pattern to obtain synthesized images;
    an output for displaying the synthesized images.

2. A hairdo pattern selecting system as claimed in claim 1, wherein the synthesized images are displayed as continuous synthesized images at a prescribed speed.

3. A hairdo pattern selecting system as claimed in claim 2, wherein the prescribed angle range of the hairdo pattern images is 225° with reference to the center back of the head of the person.

4. A hairdo pattern selecting system as claimed in claim 1, wherein a synthesized image of a prescribed angle is output as a still image on a display.

5. A hairdo pattern selecting system as claimed in claim 4, wherein the prescribed angle range of the hairdo pattern images is 225° with reference to the center back of the head of the person.

6. A hairdo pattern selecting system as claimed in claim 1, wherein a synthesized image of a prescribed angle is output as a hard copy on a printer.

7. A hairdo pattern selecting system as claimed in claim 6, wherein the prescribed angle range of the hairdo pattern images is 225° with reference to the center back of the head of the person.

8. A hairdo pattern selecting system as claimed in claim 1, wherein the prescribed angle range of the hairdo pattern images is 225° with reference to the center back of the head of the person.

9. A method for selecting a hairdo pattern comprising:

storing a plurality of hairdo patterns in a memory, each of the hairdo patterns including hairdo pattern images in a prescribed angle range to be shown at a prescribed speed;

rotatably driving a camera to obtain head images in the prescribed angle range and at a prescribed speed from around the head of a person;

synthesizing the head images with the hairdo pattern images of a selected hairdo pattern to obtain synthesized images;

outputting the synthesized images for display.

10. A method for selecting a hairdo pattern as claimed in claim 9, wherein the synthesized images are displayed as continuous synthesized images at a prescribed speed.

11. A method for selecting a hairdo pattern as claimed in claim 10, wherein the prescribed angle range of the hairdo pattern images is 225° with reference to the center back of the head of the person.

12. A method for selecting a hairdo pattern as claimed in claim 9, wherein a synthesized image of a prescribed angle is output as a still image on a display.

13. A method for selecting a hairdo pattern as claimed in claim 12, wherein the prescribed angle range of the hairdo pattern images is 225° with reference to the center back of the head of the person.

14. A method for selecting a hairdo pattern as claimed in claim 9, wherein a synthesized image of a prescribed angle is output as a hard copy on a printer.

15. A method for selecting a hairdo pattern as claimed in claim 14, wherein the prescribed angle range of the hairdo pattern images is 225° with reference to the center back of the head of the person.

16. A method for selecting a hairdo pattern as claimed in claim 9, wherein the prescribed angle range of the hairdo pattern images is 225° with reference to the center back of the head of the person.

* * * * *